United States Patent
Boehme et al.

(10) Patent No.: US 12,319,146 B2
(45) Date of Patent: Jun. 3, 2025

(54) ONBOARD ELECTRICAL SYSTEM FOR A VEHICLE, VEHICLE INCLUDING AN ONBOARD ELECTRICAL SYSTEM, AND METHOD FOR OPERATING AN ONBOARD ELECTRICAL SYSTEM FOR A VEHICLE

(71) Applicants: Mercedes-Benz Group AG, Stuttgart (DE); Vitesco Technologies GmbH, Regensburg (DE)

(72) Inventors: Urs Boehme, Ehningen (DE); Franz Pfeilschifter, Regensburg (DE); Markus Orner, Renningen (DE); Andreas Maier, Uhingen (DE); Florian Fahrner, Rottenburg (DE); Stefan Seiffert, Filderstadt (DE)

(73) Assignees: MERCEDES-BENZ GROUP AG, Stuttgart (DE); VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/555,165

(22) PCT Filed: Apr. 13, 2022

(86) PCT No.: PCT/EP2022/059837
§ 371 (c)(1),
(2) Date: Oct. 12, 2023

(87) PCT Pub. No.: WO2022/219023
PCT Pub. Date: Oct. 20, 2022

(65) Prior Publication Data
US 2024/0208332 A1  Jun. 27, 2024

(30) Foreign Application Priority Data
Apr. 15, 2021  (DE) .................... 10 2021 109 442.9

(51) Int. Cl.
*B60L 1/00*     (2006.01)
*B60L 50/60*    (2019.01)
(Continued)

(52) U.S. Cl.
CPC ................. *B60L 1/00* (2013.01); *B60L 50/60* (2019.02); *B60L 53/16* (2019.02); *H02M 1/10* (2013.01); *H02M 1/32* (2013.01); *B60L 2210/10* (2013.01)

(58) Field of Classification Search
CPC .. B60L 1/00; B60L 50/60; B60L 53/16; B60L 2210/10; H02M 1/10; H02M 1/32
(Continued)

(56) References Cited

U.S. PATENT DOCUMENTS

| 2020/0091830 A1* | 3/2020 | Maruyama | ............ H02J 7/0024 |
| 2023/0406123 A1* | 12/2023 | Pfeilschifter | ........... B60L 53/11 |

FOREIGN PATENT DOCUMENTS

| DE | 10 2018 000 490 A1 | 7/2018 |
| DE | 10 2017 209 451 A1 | 12/2018 |

(Continued)

OTHER PUBLICATIONS

International Search Report issued Aug. 30, 2022 in International Appl. No. PCT/EP2022/059837.
(Continued)

*Primary Examiner* — Rexford N Barnie
*Assistant Examiner* — Swarna N Chowdhuri
(74) *Attorney, Agent, or Firm* — MEDLER FERRO WOODHOUSE & MILLS PLLC

(57) ABSTRACT

An onboard electrical system is disclosed that includes first, second and third onboard electrical sub-systems for an electric drive unit, electric components and a vehicle battery of a vehicle, respectively. In addition, the system includes a charging terminal, wherein a changeover switch, a first switch element, and a second switch element of the onboard electrical system are physically separated from one another. The charging terminal is galvanically connected to the third onboard electrical sub-system by the first switch element and to the second onboard electrical sub-system by the changeover switch during an electric charging mode of the vehicle battery. The first onboard electrical sub-system is galvanically connected to the third onboard electrical sub-system of the second switch element and to the second onboard electrical sub-system by the changeover switch during a driving mode of the vehicle.

7 Claims, 5 Drawing Sheets

(51) Int. Cl.
*B60L 53/16* (2019.01)
*H02M 1/10* (2006.01)
*H02M 1/32* (2007.01)

(58) Field of Classification Search
USPC .......................................................... 307/9.1
See application file for complete search history.

(56) References Cited

FOREIGN PATENT DOCUMENTS

| DE | 10 2019 000 238 A1 | 8/2019 |
| DE | 10 2019 008 835 A1 | 7/2020 |
| DE | 10 2019 008 824 A1 | 1/2021 |
| DE | 10 2019 007 347 A1 | 4/2021 |
| DE | 10 2020 202 251 A1 | 7/2021 |
| EP | 3 623 207 A1 | 3/2020 |

OTHER PUBLICATIONS

Office Action issued Nov. 9, 2021 in German Appl. No. 10 2021 109 442.9.
Written Opinion issued in European Patent Application No. PCT/EP2022/059837, dated Aug. 30. 2022.
International Preliminary Report on Patentability issued in European Patent Application No. PCT/EP2022/059837.

\* cited by examiner

ONBOARD ELECTRICAL SYSTEM FOR A VEHICLE, VEHICLE INCLUDING AN ONBOARD ELECTRICAL SYSTEM, AND METHOD FOR OPERATING AN ONBOARD ELECTRICAL SYSTEM FOR A VEHICLE

FIELD

The invention relates to an onboard electrical system for a vehicle with a first onboard electrical sub-system for an electric drive unit of the vehicle and a second onboard electrical sub-system for electric components of the vehicle different from the electric drive unit as well as a third onboard electrical sub-system for a vehicle battery of the vehicle. Furthermore, the onboard electrical system comprises a charging terminal for providing a charging voltage of a power source. Furthermore, the invention relates to a vehicle with a corresponding onboard electrical system, and the invention also relates to a method for operating an onboard electrical system.

BACKGROUND

For example, DE 10 2019 008 835 A1 discloses a vehicle with a high-voltage onboard electrical system. Therein, the high-voltage onboard electrical system is divided into two partial areas, wherein the first partial area is arranged in a first installation space of the vehicle and the second partial area is arranged in at least one second installation space of the vehicle, wherein the division of the high-voltage onboard electrical system into the two partial areas is formed such that only operations under electrical voltage of the first partial area of the high-voltage onboard electrical system are possible in the first installation space of the vehicle and operations in a voltage-free state of the second partial area of the high-voltage onboard electrical system are possible in the at least one second installation space of the vehicle.

DE 10 2019 008 824 A1 discloses an onboard electrical system for a vehicle. The onboard electrical system comprises two potential lines, which are galvanically connectable or connected to a vehicle battery. In particular, the onboard electrical system is divided into three onboard electrical sub-systems.

SUMMARY

The invention is based on the object of specifying an onboard electrical system for a vehicle improved with respect to the prior art.

This object is solved by an onboard electrical system, a vehicle as well as a method according to the independent claims. Meaningful developments are apparent from the dependent claims.

An aspect of the invention relates to an onboard electrical system for a vehicle, including a first onboard electrical sub-system for an electric drive unit of the vehicle, a second onboard electrical sub-system for electric components of the vehicle different from the electric drive unit, a third onboard electrical sub-system for a vehicle battery of the vehicle, a charging terminal for providing a charging voltage of a power source, wherein a changeover switch, a first switch element and a second switch element of the onboard electrical system are physically separated from each other, the second onboard electrical sub-system is galvanically connected either to the first onboard electrical sub-system or to the charging terminal by means of the changeover switch, during an electric charging mode of the vehicle battery, the charging terminal is galvanically connected to the third onboard electrical sub-system by means of the first switch element and to the second onboard electrical sub-system by means of the changeover switch, and the first onboard electrical sub-system is galvanically separated from the third onboard electrical sub-system by means of the second switch element and from the second onboard electrical sub-system by means of the changeover switch, and during a driving mode of the vehicle, the charging terminal is galvanically separated from the third onboard electrical sub-system by means of the first switch element and from the second onboard electrical sub-system by means of the changeover switch, and the first onboard electrical sub-system is galvanically connected to the third onboard electrical sub-system by means of the second switch element and to the second onboard electrical sub-system by means of the changeover switch.

By the proposed onboard electrical system, in particular upon a direct current charging process of the vehicle, safety limit values of Y-capacitors or Y-capacitances with respect to the energy contents thereof can be complied with. Thereby, EMC (electromagnetic compatibility) requirements of the vehicle and in particular of the onboard electrical system can in particular be complied with.

By the changeover switch according to the invention, the first switch element and the second switch element, an improved electrical high-voltage safety with respect to the vehicle battery of the vehicle results. By the use of multiple switch elements physically separated from each other, like the changeover switch, the first switch element and the second switch element, the second onboard electrical sub-system can be separated from the power source external to vehicle, in particular a direct current charging station, by small, inexpensive changeover switches upon a direct current charging process of the vehicle battery. In contrast, large, heavy and cost-intensive DC contactors can be omitted compared to the prior art.

In particular, the driving mode and the charging mode of the vehicle exclude each other to the effect that the components respectively not required are galvanically separated from the remaining onboard electrical system. Thus, these separated components no longer contribute to the overall capacitance of the onboard electrical system by their Y-capacitances. Accordingly, large Y-capacitances can therefore be installed in the components without exceeding the allowable limit value. This in particular allows complying with safety requirements with respect to the energy content of the Y-capacitances and the EMC requirements.

In order to be able to achieve this, in the electric charging mode of the vehicle battery, at least the first onboard electrical sub-system can be separated with respect to the units to be charged. By the onboard electrical system according to the invention, providing multiple battery outputs for each individual onboard electrical sub-system can be omitted. Similarly, by the division of the mutually physically separated switches of the onboard electrical system according to the invention, over-dimensioned, cost-intensive and error-prone changeover switches as in the prior art can be omitted. By omitting multiple battery outputs, an expensive protection of each of these outputs can be omitted, whereby a cost reduction can be performed, and safety-critical flaws can be minimized.

The vehicle, in particular motor vehicle, in particular road vehicle, is in particular formed as an electric vehicle or as a hybrid vehicle. In particular, the vehicle battery, in particular a high-voltage battery, can be electrically charged by connection of the vehicle, in particular the onboard electrical system thereof, in particular a high-voltage onboard electrical system, to at least one electrical energy source external to vehicle as the current charging source, in particular to a charging station.

In particular, the onboard electrical system can be a high-voltage onboard electrical system.

In particular, an electrical DC voltage, which is in particular greater than about 60 Volts, is to be understood by the term "high-voltage". In particular, the term "high-voltage" is to be interpreted as compliant with the standard ECE R 100.

The onboard electrical system is divided at least into the first onboard electrical sub-system, the second onboard electrical sub-system and the third onboard electrical sub-system. In order that the vehicle and in particular the onboard electrical system can be supplied with an electrical voltage, the onboard electrical system can be electrically connected to the charging source or power source via the charging terminal thereof, in particular voltage terminals, such that the charging voltage, in particular a DC voltage, can be provided to the vehicle, in particular to the onboard electrical system.

The electric drive unit is in particular intended for driving the vehicle. Thus, the at least one electric drive unit is in particular a so-called electric traction machine of the vehicle. The onboard electrical system can for example also comprise multiple of such electric drive units, in particular a front electric drive unit, in particular for driving wheels of a front axle of the vehicle, and a rear electric drive unit, in particular for driving wheels of a rear axle of the vehicle.

The second onboard electrical sub-system comprises the electric components. The electric components can for example be electric accessories such as for example an electric refrigerant compressor or an electric heating element.

Electric components of the onboard electrical system usually possess Y-capacitors for establishing electromagnetic compatibility. Such Y-capacitors can also be provided on the side of the charging station, which is also in the area of the DC power source. The effect of Y-capacitors in the range of the electromagnetic compatibility, in particular of the radio interference suppression, is known to the expert, such that separate further explanations are not required in this respect. For the rest, reference is made to the relevant standardization, thus, for example the guideline 2014/30/EU, about the electromagnetic compatibility, DIN/EN 61000 and furthers.

For reasons of the electrical safety, an electrical energy stored in all of the Y-capacitors is not to exceed a presettable maximum value. Such a value is for example 0.2 J. This regularly results in a constructive design such that the capacitance values of the Y-capacitors are usually selected smaller on the side of the vehicle than they would be required for a proper establishment of the electromagnetic compatibility, in particular with respect to the electric components, which are connected to the onboard electrical system.

Among other things, it has turned out to be problematic if the vehicle is to be charged by means of an AC voltage from a charging station. In such a case, the overall capacitance provided on the side of the vehicle at Y-capacitors proves to be hindering because these Y-capacitors can also cause a leakage current, which can result in a malfunction initiation on the side of the charging station and/or overall can exceed an admissible value of the leakage currents in electrical equipments, as it is for example also specified in the standard, thus for example in the standard DIN EN 61800 or the like. Fundamentally, this problem can only be solved by reduction of the capacitance values of the Y-capacitors provided in the vehicle, but wherein it is to be considered that the expenditure of the filter units can be considerably increased thereby.

Moreover, it is required in particular in charging by means of a DC voltage, that an energy content of all of the effective Y-capacitors does not exceed a preset overall energy content. Hereto, a maximum value of 0.2 J is currently provided, which is not to be exceeded. By the plurality of the electric components of the vehicle and the increasing power, for example in high-voltage components, the overall capacitance of the present Y-capacitors becomes greater and greater, whereby the energy content stored there also increases corresponding to the increasing overall capacitance. Moreover, it is to be considered that the energy content of the Y-capacitors is particularly critical in particular in the range of high-voltage, particularly as it is to be considered that the electrical energy stored in the Y-capacitors is quadratically dependent on the electrical voltage of the Y-capacitors. Thereby, complying with the requirements concerning maximum energy content with respect to respective high-voltage potential becomes particularly difficult especially in the range of high-voltage. Especially in vehicles, it proves to be problematic to satisfy both requirements concerning the electromagnetic compatibility and requirements concerning the electrical safety with respect to the energy of the Y-capacitors at the same time.

These problems are remedied by the onboard electrical system according to the invention, because by the onboard electrical system according to the invention, in particular by the division to the first, second and third onboard electrical sub-system and by the different switching possibilities, different operating modes of the vehicle can be optimized towards the relevant requirement. This allows a design of the Y-capacitors of the individual functions considering vehicle states respectively to be taken.

The onboard electrical system according to the invention allows a reduction of costs, weight and installation space for the onboard electrical system by the employment of the mutually physically separated changeover switches, first switch element and second switch element. In particular, complex, cost-intensive and lossy switching devices can be omitted.

With the aid of the onboard electrical system according to the invention, it can in particular be achieved that in the driving mode or in the charging mode of the vehicle, either the electric drive unit is directly connected to the vehicle battery or the power source or the charging station is directly connected to the vehicle battery. According to which vehicle state is present, the other component is galvanically separated from the vehicle battery. The second onboard electrical sub-system, in particular the accessories of the second onboard electrical sub-system, can be electrically supplied either by means of the electric drive unit or by means of the DC power source with the aid of the changeover switch.

It is provided that the second onboard electrical sub-system is connected to the changeover switch by means of two potential lines, wherein at least one of the two potential lines comprises a semiconductor fuse.

The semiconductor fuse is for example an electronically resettable semiconductor fuse. For example, the potential lines can have a reduced line cross-section. In order to unipolarly protect the potential lines for line protection, the semiconductor fuse can be interconnected to at least one of the two potential lines. In particular, the semiconductor fuse can alternatively be replaced by a safety fuse. By the employment of the changeover switch and the semiconductor fuse, the supply of the second onboard electrical sub-system can be performed without expensive requirements. Furthermore, the semiconductor fuse can comprise a switch element besides an electrical fuse. The switch element can for example be a metal oxide semiconductor field effect transistor (MOSFET) or a transistor, or a thyristor or a diode.

In particular, the two potential lines serve for electrically connecting the changeover switch to the first onboard electrical sub-system. In particular, one of the potential lines is an electrical line for a positive voltage potential and the other potential line is an electrical line for a negative voltage potential. In particular, the potential lines can be a partial piece of a complex potential line of the onboard electrical system. Thus, very different components of the onboard electrical system can be electrically connected by the complex potential line.

Furthermore, it is provided that the semiconductor fuse and the changeover switch together form a hybrid switching device, wherein the changeover switch is switchable load-free, and the second onboard electrical sub-system is protected from a short circuit by the hybrid switching device. In other words, very different functionalities can be provided for the onboard electrical system with the aid of the combination of the semiconductor fuse and the changeover switch. By the combination of the multiple functionalities of the semiconductor fuse and the changeover switch, switching operations can be performed simpler and in particular more loss-free. Thus, the changeover switch can in particular be designed only to the voltage level of the second onboard electrical sub-system. Accordingly, the changeover switch can be simpler, more inexpensively and more efficiently used compared to the switching devices in the prior art. By the combination of the semiconductor fuse and the changeover switch, the first onboard electrical sub-system can be switched voltage-free in the charging process of the vehicle battery in a simple and efficient manner.

In particular, the combination of changeover switch and semiconductor fuse allows load-free switching of the changeover switch in connecting the second onboard electrical sub-system to the charging terminal. As a result, the combination of semiconductor fuse and changeover switch allows the employment of more inexpensive and simpler changeover switches for coupling two differently pre-charged or charged onboard electrical sub-systems. In particular, the hybrid switching device can be used both for the charging mode of the vehicle battery and for the driving mode of the vehicle. With the aid of the hybrid switching device, either the electric component of the second onboard electrical sub-system can be protected from a short circuit in the driving mode and the electric components of the second onboard electrical sub-system can also be protected from a short circuit in a charging mode of the vehicle battery.

Furthermore, the hybrid switching device offers the advantage that upon a short circuit or short circuit case in the second onboard electrical sub-system or accessory onboard electrical system, a faster tripping can be performed than main switches or fuses located behind. Thus, a selective tripping of the fuse can be achieved. Here, a redundant protection mechanism for the onboard electrical system and thus for the vehicle in particular results here.

Optionally, an efficient switching device can be specially presented for the second onboard electrical sub-system or for accessories of the onboard electrical system with the aid of the hybrid switching device.

In a further embodiment of the invention, it is provided that the hybrid switching device is additionally galvanically connected to an electric charging unit of the onboard electrical system or the hybrid switching device is additionally galvanically connected to the electric charging unit and to a DC voltage converter of the first onboard electrical system. In other words, the hybrid switching device can be extended by further functionalities. Thus, the hybrid switching device satisfies very different functionalities for the onboard electrical system. For example, the electric charging unit can be an onboard charger, in particular a charging unit for converting an AC voltage of an external AC voltage source into a DC voltage. Thus, upon supply of the second onboard electrical sub-system via an AC voltage, this charging path can also be protected with the aid of the semiconductor fuse. Alternatively thereto, the hybrid switching device can also be galvanically connected to the DC voltage converter of the second onboard electrical sub-system besides this electric charging unit. The DC voltage converter is in particular a DC/DC converter, by which a battery voltage of the vehicle battery or a voltage of the electric charging unit can in particular be converted into a corresponding voltage for supplying the electric components of the second onboard electrical sub-system.

In a further embodiment, it is provided that the semiconductor fuse comprises a switch element, wherein a current flow from the changeover switch towards the second onboard electrical sub-system can be inhibited by the switch element. Accordingly, the semiconductor fuse comprises a reversible or switchable switch element, in particular a switch. Instead or additionally, the semiconductor fuse can for example comprise a diode. In particular, the diode can be integrated or interconnected in the semiconductor fuse such that upon an occurring short circuit or another incident with the onboard electrical system, the electric components of the second onboard electrical sub-system are protected from overvoltage and overcurrent, respectively. Accordingly, the diode has a reverse direction such that a current flow into the second onboard electrical sub-system can be blocked. Accordingly, harmful currents cannot flow into the second onboard electrical sub-system.

In a further embodiment, it is provided that at least one potential line between the changeover switch and the direct current charging terminal comprises an electrical fuse. This electrical fuse can for example be a safety fuse or another electrical or electromechanical fuse. Thus, upon a short circuit or a too high current level, the electrical fuse formed as a safety fuse can be activated and interrupt a current flow, whereby electric components of the onboard electrical system can be protected.

In a further embodiment of the invention, it is provided that the first and the second switch element are each formed as a contactor or as a semiconductor switch. With the aid of the first and the second switch element, the vehicle battery can be connected to the electric drive unit or to the DC power source corresponding to the vehicle state. For example, the first and the second switch element can each be formed as a relay. The first and the second switch element can for example be high-voltage contactors or battery contactors.

A further aspect of the invention relates to a vehicle with an onboard electrical system according to the preceding aspect or an embodiment thereof. For example, the vehicle is an electrically driven vehicle like a hybrid vehicle or an electric vehicle. In particular, the vehicle comprises the previously described onboard electrical system.

In a further embodiment, it is provided that the second onboard electrical sub-system is connected to at least one of the electric components: electric refrigerant compressor unit, electric heating unit, heat pump and DC voltage converter. In other words, the second onboard electrical sub-system comprises various electric components except for the electric drive unit of the vehicle. In particular, the second onboard electrical sub-system contains accessories of the vehicle.

A further aspect of the invention relates to a method for operating an onboard electrical system according to any one of the preceding aspects or an embodiment thereof. A battery voltage is provided by the vehicle battery and the charging voltage is provided by the charging terminal. During the electric charging mode of the vehicle battery, the vehicle battery and the first further onboard electrical sub-system are supplied with the charging voltage of the charging terminal and during the driving mode of the vehicle, the first onboard electrical sub-system and the second onboard electrical sub-system are supplied with the battery voltage.

In particular, the previously described onboard electrical system can comprise a control unit, by which the just described method can be carried out. In particular, during a DC charging process of the vehicle battery, the accessories of the second onboard electrical sub-system can be coupled to the DC charging path, thus the DC voltage source, and in a driving state of the vehicle, the accessories can be coupled to a drive onboard electrical system as the first onboard electrical sub-system and be electrically supplied, respectively.

Embodiments of individual aspects are to be regarded as advantageous embodiments of the other aspects and vice versa.

BRIEF DESCRIPTION OF THE FIGURES

Further advantages, features and details of the invention are apparent from the following description of preferred embodiments as well as based on the drawing(s). The features and feature combinations mentioned above in the description as well as the features and feature combinations mentioned below in the description of figures and/or shown in the figures alone are usable not only in the respectively specified combination, but also in other combinations or alone without departing from the scope of the invention.

In the figures, functionally identical elements are provided with the same reference characters.

DETAILED DESCRIPTION

Figure 1:
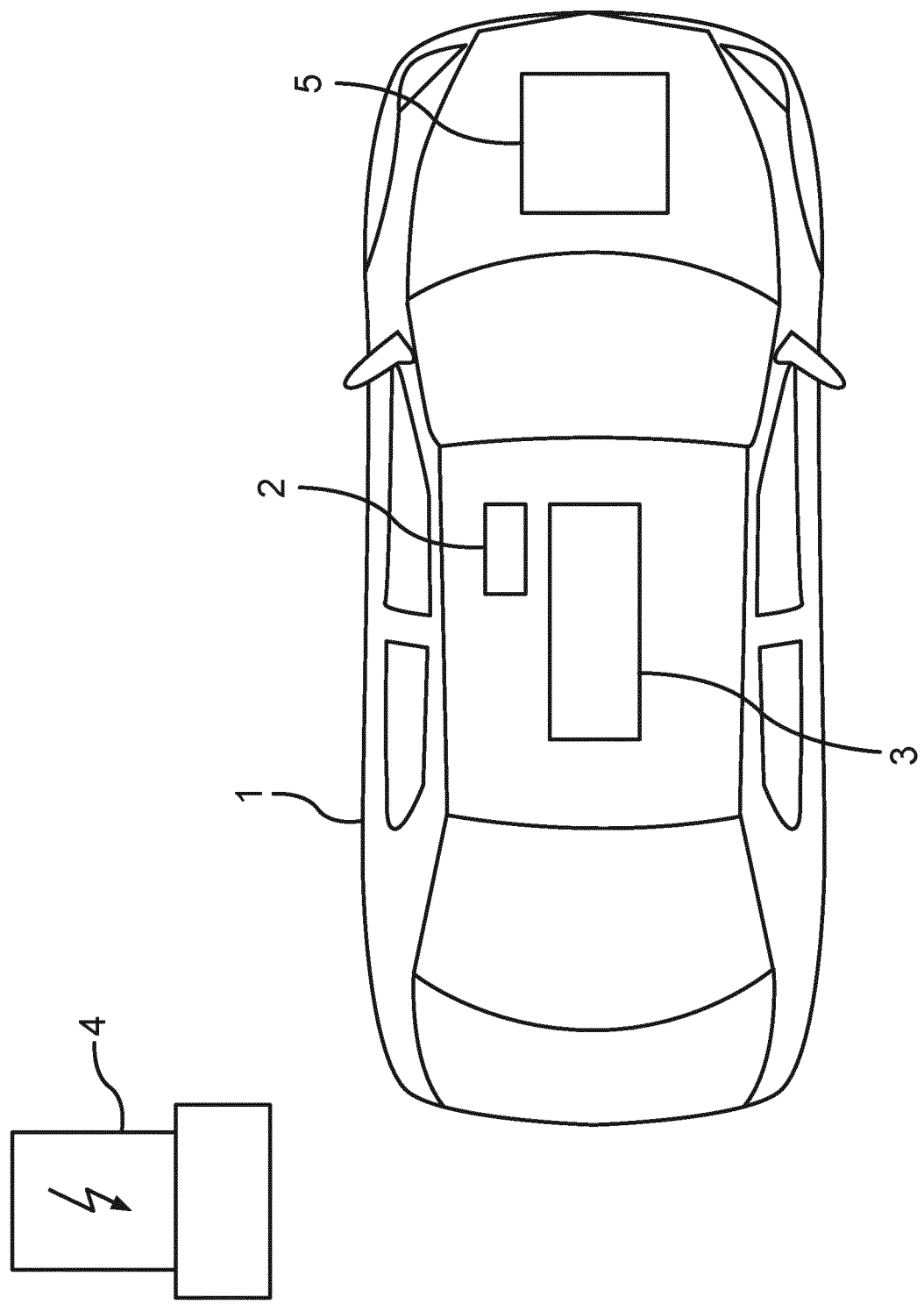
FIG. 1 is a schematic representation of a vehicle with an onboard electrical system.

FIG. 1 shows a schematic representation of a vehicle 1. The vehicle 1, in particular motor vehicle, in particular road vehicle, is in particular formed as an electric vehicle or as a hybrid vehicle. In particular, a vehicle battery 2, in particular a high-voltage battery, can be electrically charged by connection of the vehicle 1, in particular of an onboard electrical system 3 of the vehicle, to at least one electrical energy source external to vehicle, in particular a power source 4. In particular, the power source 4 is a charging station or a charging device or a charging system. In particular, a charging process of the vehicle 1 by means of a direct current or an alternating current can be performed with the aid of the power source 4. The onboard electrical system 3 can for example be a high-voltage onboard electrical system.

Furthermore, the vehicle 1 comprises at least one electric drive unit 5, which can be supplied with electrical energy by the vehicle battery 2, to be able to set the vehicle 1 in motion.

Figure 2:
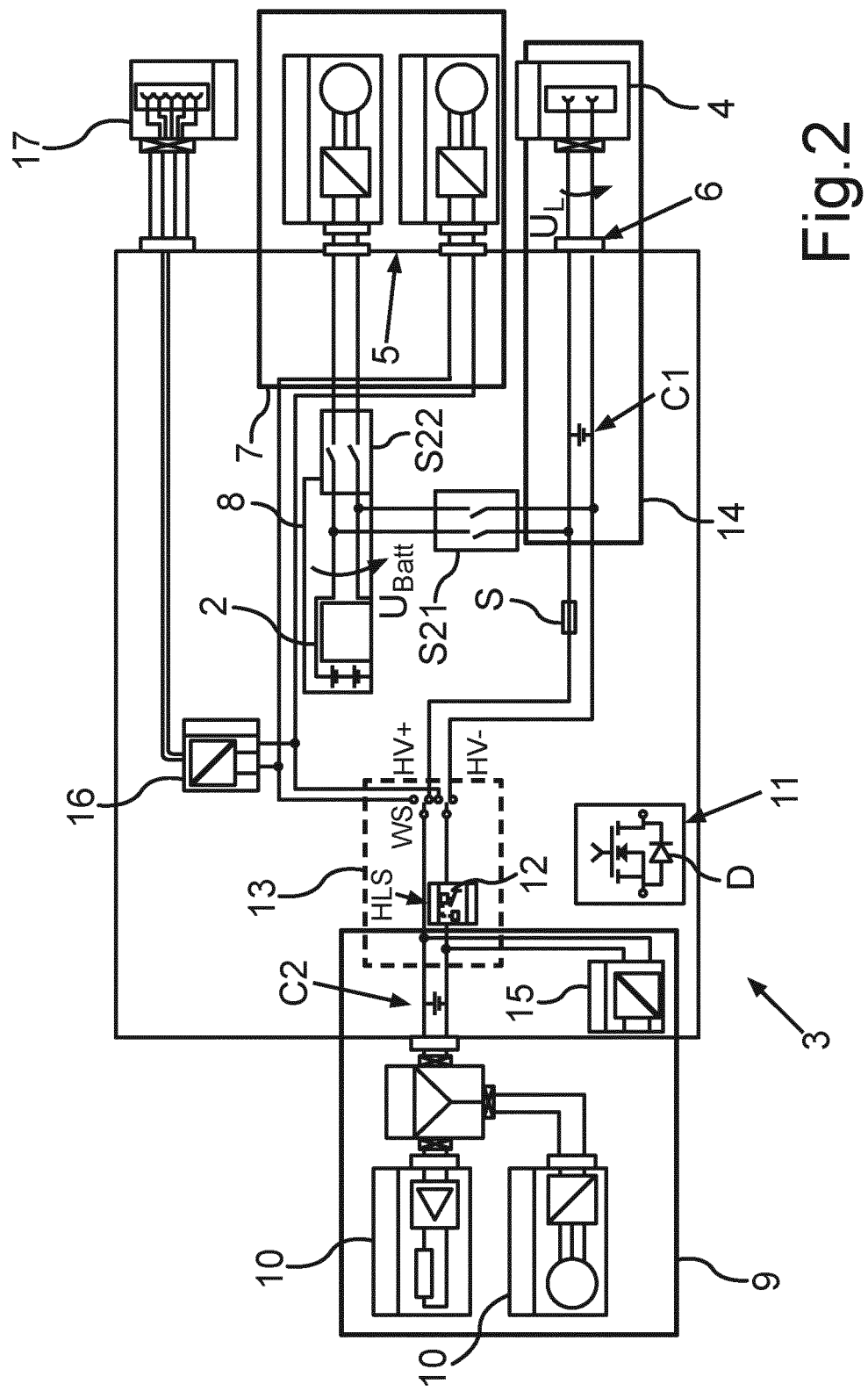
FIG. 2 is a schematic embodiment of the onboard electrical system from FIG. 1.

In FIG. 2, a schematic representation of the onboard electrical system 3 is illustrated. For example, the onboard electrical system 3 can comprise the vehicle battery 2, at least the one electric drive unit 5. Furthermore, the onboard electrical system comprises a charging terminal 6, by which the onboard electrical system 3 can be connected to the power source 4. In particular, the charging terminal 6 is a vehicle-side charging terminal of the vehicle 1. Furthermore, the at least one electric drive unit 5 can for example be a constituent of a first onboard electrical sub-system 7 of the onboard electrical system 3. The vehicle battery 2 can in turn be a constituent of a third onboard electrical sub-system 8. Furthermore, the onboard electrical system 3 can comprise a second onboard electrical sub-system 9. The second onboard electrical sub-system 9 can in particular comprise electric components 10 different from the electric drive unit 5. In particular, the electric components 10 are accessories of the vehicle 1. For example, the electric components 10 can be an electric refrigerant compressor unit, an electric heating unit, a heat pump or a DC voltage converter.

For example, the vehicle battery 2 can have a battery voltage $U_{Batt}$ with a voltage value of for example 800 Volts DC. By the power source 4, a charging voltage $U_L$ of for example 400 Volts, in particular 500 Volts DC, can for example be provided. Thus, for a charging process of the vehicle battery 2 by means of the power source 4, the charging voltage $U_L$ has to be transformed up to the voltage level of the battery voltage $U_{Batt}$ by means of an onboard charging unit or an onboard charger.

In order that the onboard electrical system 3 can be operated as efficiently as possible, for example a charging mode, in particular electric charging mode, for the vehicle battery 2 can be set in a first state of the onboard electrical system 3. For a second state of the onboard electrical system 3, the onboard electrical system 3 is set for a driving mode of the vehicle 1. For example, the onboard electrical system 3 comprises individual switch elements, by which either the state for charging the vehicle battery 2 or for the driving mode of the vehicle 1 can be set. For example, a changeover switch WS, a first switch element S21 and a second switch element S22 of the onboard electrical system 3 are arranged physically separated from each other. In particular, these three switch elements WS, S21, S22 are arranged or interconnected separated from or to each other within the onboard electrical system 3. For example, the first and the second switch element S21, S22 can each be formed as a contactor or as a semiconductor switch or as a relay.

For example, the first and the second switch element S21, S22 can be all-pole separating elements.

With the aid of the changeover switch WS, the second onboard electrical sub-system 9 can be galvanically connected either to the first onboard electrical sub-system 7 or to the DC voltage charging terminal 6. Thus, the changeover switch WS serves for alternatingly electrically coupling or electrically connecting the second onboard electrical sub-system 9 either to the first onboard electrical sub-system 7 or to the charging terminal 6 or a DC voltage charging terminal. Thus, with the aid of the changeover switch WS, the electric components 10 of the second onboard electrical sub-system 9 can be supplied with energy either by means of the vehicle battery 2 or by the power source 4.

In the following, it is now explained, which switch positions the onboard electrical system 3 has during an electric charging mode of the vehicle battery 2. For the electric charging mode of the vehicle battery 2, the charging terminal 6 can be galvanically connected to the third onboard electrical sub-system 8 by means of the first switch element S21. Thus, the first switch element S21 is closed in this case such that a direct electrical connection between the vehicle battery 2 and the external power source 4 is present. Furthermore, by means of the changeover switch WS, the charging terminal 6 can be galvanically connected to the second onboard electrical sub-system T2. Thus, the electric components 10 can be supplied by means of the charging voltage $U_L$. During the electric charging mode, the first onboard electrical sub-system 7 is galvanically separated from the third onboard electrical sub-system 8 by means of the second switch element S22 in this respect. In other words, the second switch element S22 is opened such that the electric drive unit 5 is in particular disconnected or separated from the vehicle battery 2. Furthermore, by means of the changeover switch WS, the first onboard electrical sub-system 7 can be galvanically separated from the second onboard electrical sub-system 9. Thus, during the charging mode, the accessories of the accessory onboard electrical system, in particular of the second onboard electrical sub-system 9, are no longer supplied with energy by means of the vehicle battery 2 and/or the electric drive unit 5. Thus, during the electric charging mode of the vehicle battery 2, a direct electrical connection between the power source 4 and the vehicle battery 2 and the second onboard electrical sub-system 9 is present.

In particular, the components of the onboard electrical system 3 are electrically connected to each other by means of potential lines HV+, HV−. They are in particular electrical lines, in particular high-voltage lines, of the onboard electrical system 3.

In particular, for performing a safe charging process of the vehicle battery 2, an electrical fuse S can be interconnected between at least one potential line HV+ between the changeover switch WS and the charging terminal 6. It can for example be a safety fuse. It serves as a protective function for short circuits or for overcurrents.

In the following, the case is described, in which the vehicle 1 is in a driving mode. For the driving mode of the vehicle 1, the charging terminal 6 can be galvanically separated from the third onboard electrical sub-system 8 by means of the first switch element S21. Thus, the first switch element S21 is opened, such that an electrical connection is not present between the vehicle battery 2 and the power source 4. In addition, by means of the changeover switch WS, the charging terminal 6 can be galvanically separated from the second onboard electrical sub-system 9. Thus, the changeover switch WS is set to the voltage level of the battery voltage 2 in this case. In particular, for the driving mode of the vehicle 1, the first onboard electrical sub-system 7 is galvanically connected to the third onboard electrical sub-system 8 by means of the second switch element S22. Thus, the second switch element S22 is closed such that an electrical connection is present between the vehicle battery 2 and the at least one electric drive unit 5. Thus, the electric drive unit 5 can be supplied with electrical energy, in particular the battery voltage $U_{Batt}$, for an advancement drive of the vehicle 1. In addition, by means of the changeover switch WS, the second onboard electrical sub-system 9 can be galvanically connected to the first onboard electrical sub-system 7. Thus, during the driving mode of the vehicle 1, the electric components 10 of the second onboard electrical sub-system 9 can be supplied with electrical energy by the vehicle battery 2 and/or the electric drive unit 5.

In order that the changeover switch WS can be load-free alternatingly switched between the first onboard electrical sub-system 7 and the charging terminal 6, a semiconductor fuse HLS can be interconnected between at least one of the two potential lines HV+, HV− between the second onboard electrical sub-system 9 and the changeover switch WS. The semiconductor fuse HS is in particular a unidirectionally blocking semiconductor fuse. With the aid of this semiconductor fuse HLS, the changeover switch WS can be switched load-free. The semiconductor fuse HLS optionally comprises a semiconductor switch 11 and optionally a current capturing unit. This semiconductor switch 11 can be correspondingly switched according to whether the onboard electrical system 3 is in a charging mode of the vehicle battery 2 or in a driving state of the vehicle 1. In the simplest case, the semiconductor fuse can comprise a simple switch element 12 instead of the semiconductor switch 11. In particular if the vehicle battery 2 is charged by means of the charging voltage $U_L$, a switch element 12 of the semiconductor fuse HLS can be closed. Instead or additionally, the semiconductor fuse HLS further comprises at least one diode D. It is in particular connected in parallel with the switch element 12. The diode D can in particular be a body diode, in particular a MOSFET body diode, of the semiconductor switch 11 of the semiconductor fuse HLS. In particular, the diode D has a reversing direction, such that a current flow from the changeover switch WS towards the second onboard electrical sub-system 9 can be inhibited or prevented. Thus, in particular in case of a short circuit, a short circuit current cannot flow into the second onboard electrical sub-system 9. Thus, with the aid of the diode D and/or the switch element 12, a battery current or a charging current of the charging station as the power source 4 can be interrupted in case of a short circuit. Furthermore, the diode D and/or the switch element 12 can be interconnected such that a current can always flow from the second onboard electrical sub-system 9 towards the changeover switch WS. The semiconductor fuse HLS can be unidirectionally blocking, wherein the semiconductor fuse can have a parasitic/undesired behavior. In order to counteract this, the diode D is provided.

In particular, the semiconductor fuse HLS and the changeover switch WS together can form a hybrid switching device 13. With the aid of the hybrid switching device 13, the changeover switch WS can be particularly advantageously switched load-free. As a result, the changeover switch WS does not have to be designed or dimensioned to high currents and/or voltages.

For example, the first onboard electrical sub-system 7 can be referred to as drive onboard electrical system or traction onboard electrical system. The second onboard electrical sub-system 9 can for example be referred to as accessory onboard electrical system.

For example, the first switch element S21 can be formed as a DC charging contactor. The second switch element S22 can be formed as a traction contactor.

In order to be able to particularly efficiently operate the onboard electrical system 3, it can be provided that for the start of the charging process or for the charging mode of the vehicle battery 2, the onboard electrical system 3 is precharged before connecting the vehicle battery 2. Thus, the onboard electrical system 3 can be raised to a preset voltage level.

Figure 3:
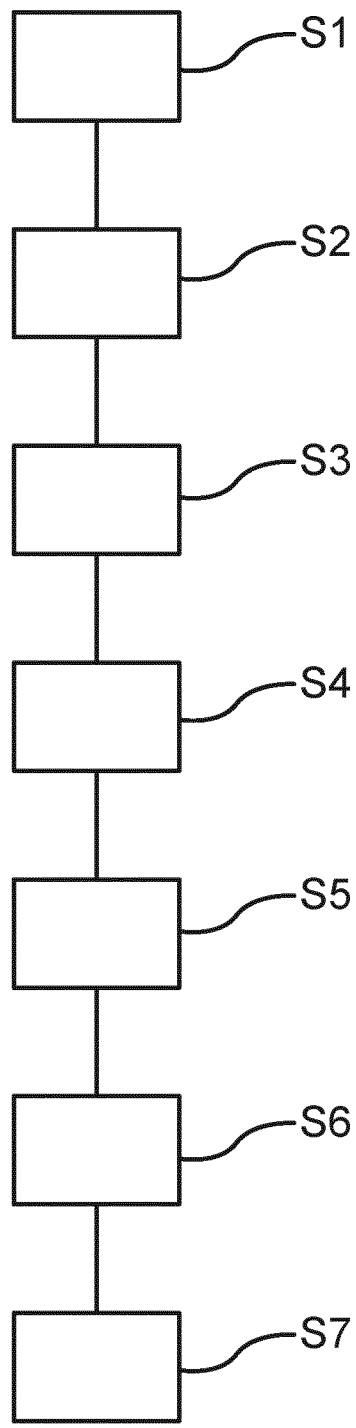
FIG. 3 is a schematic flow diagram for pre-charging the onboard electrical system from FIG. 2.

In the following FIG. 3, a schematic flow of a precharging process of the onboard electrical system 3 of the vehicle 1 is described. In particular, the pre-charging process is performed immediately, thus directly in time before the charging process of the vehicle battery 2. In particular, the pre-charging process is performed immediately before the following charging process of the vehicle battery 2. Thus, viewed in time, the pre-charging process is affected directly before the charging process is performed. In particular, the charging process of the vehicle battery 2 can be performed only when the pre-charging process of the onboard electrical system 3 has been performed.

In an optional first step S1, the vehicle battery 2, in particular the third onboard electrical sub-system 3, can be galvanically connected to the second onboard electrical sub-system 9 of the onboard electrical system 3 by means of the second switch element S22 and the changeover switch WS. In addition, by means of the first switch element S21, the vehicle battery 2 can be galvanically separated from a charging path 14 (compare FIG. 2), which includes the charging terminal 2. Therein, the first onboard electrical sub-system 9 and the second onboard electrical sub-system 9 can be galvanically separated from the charging path 14 and in particular from the charging terminal 6 by means of the changeover switch WS. Thus, the power source 4 is only connected to the vehicle-side charging terminal 6 and thus to the charging path 14 in this state. In other words, in this first step S1, the initial state for pre-charging the onboard electrical system 3 is explained. During this initial state, an HV onboard electrical system of the vehicle 1 can for example be discharged. Furthermore, in the initial state, in particular during the pre-charging process, the switch element 12 of the semiconductor fuse HLS is opened.

In an optional following second step S2, at least one line capacitance C1 of the charging path 14 of the onboard electrical system 3 can for example be pre-charged to a first voltage value by the power source 4 connected to the charging path 14. In particular, an intermediate circuit of the charging path 14 is pre-charged to the first voltage value in this process.

In a subsequent optional third step S3, at least one capacitor C2 of the second onboard electrical sub-system 9 can be pre-charged to a second voltage value by the vehicle battery 2. Therein, an intermediate circuit of the second onboard electrical sub-system 9 can herein also be pre-charged. Thus, the capacitor C2 is pre-charged to the second voltage value as the target voltage by means of the battery voltage $U_{Batt}$ by means of the connection between the changeover switch WS and the vehicle battery 2. Therein, the at least one capacitor C2 of the second onboard electrical sub-system 9 can be performed by converting the battery voltage $U_{Batt}$ of the vehicle battery 2 by means of a DC voltage converter 15 (compare FIG. 2) of the second onboard electrical sub-system 9. The DC voltage converter 15 can for example be a DC/DC converter.

In particular, the step S2 and step S3 can be performed at the same time, thus parallel. Thus, the pre-charging process of the onboard electrical system 3 can be more efficiently performed. Optionally, the first and/or second voltage value can be set or defined depending on the battery voltage $U_{Batt}$. In particular, the battery voltage $U_{Batt}$ can have a voltage value of 800 Volts. Therein, the first and/or second voltage value thus can in particular be 800 Volts. In order to be able to employ the semiconductor fuse HS unidirectionally blocking, the second voltage value can have a voltage difference of for example 10 Volts, in particular 20 Volts, advantageously 30 Volts, compared to the first voltage value. Thus, the changeover switch WS can be switched load-free.

In a subsequent optional fourth step S4, it can be examined, which state of charge the two capacitors or capacitances C1, C2 have. Thus, depending on the respective state of charge of the capacitors or C1, C2, the charging process of the vehicle battery 2 of the vehicle 1 can be performed by means of the power source 4.

In particular, the charging process of the vehicle battery 2 is affected when the line capacitance C1 of the charging path 14 has been charged to the first voltage value and the capacitor C2 of the second onboard electrical sub-system 9 has been charged to the second voltage value. If this is the case, thus, the vehicle battery 2 can be galvanically connected to the charging path 14 by means of the first switch element S21 and galvanically separated from the second onboard electrical sub-system 9 by means of the second switch element S22 and the changeover switch WS for example by a pre-charging switching device of the onboard electrical system 3. Thus, the vehicle battery 2 can be charged by means of the charging voltage $U_L$. Here, a switching operation of the changeover switch WS is thus effected, in particular load-free, such that the vehicle battery 2 can be charged by means of the charging voltage $U_L$ on the one hand and the electric components 10 of the second onboard electrical sub-system 9 are also supplied by means of the charging voltage $U_L$ from the power source 4.

In an optional additional or parallel step S5, during switching to the charging process of the vehicle battery 2, the first onboard electrical sub-system 7, in particular the electric drive unit 5, can be discharged. Here, an absence of voltage can thus be established.

In an additional optional sixth step S6, for the final charging mode or charging process of the vehicle battery 2, the switch element 12 of the semiconductor fuse HLS can be additionally closed. This can affect a final voltage adaptation of the second onboard electrical sub-system 9 to the voltage level of the power source 4. In a conclusive optional seventh step S7, the vehicle battery 2 can now be charged by means of the power source 4 on the one hand and the electric components 10 of the second onboard electrical sub-system 9 can be supplied in the meantime. Parallel thereto, the first onboard electrical sub-system 7 and in particular the electric components of the electric powertrain are voltage-free.

Figure 4:
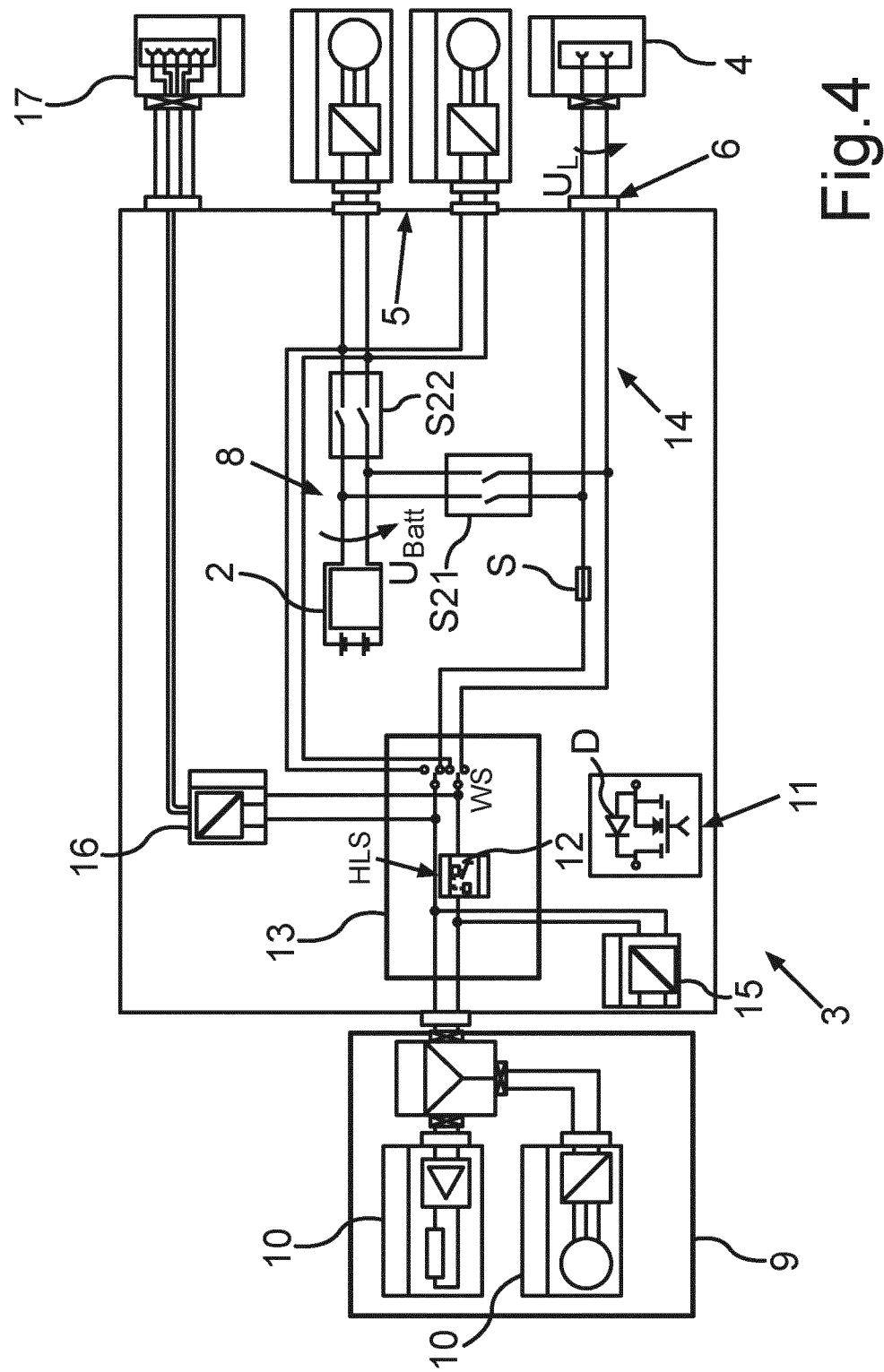
FIG. 4 is a further schematic embodiment of the onboard electrical system from FIG. 2.

In the following figures FIG. 4 and FIG. 5, two further possible switch representation of the onboard electrical system 3 are illustrated. Therein, as visible in FIG. 4, the hybrid switching device 13 can for example be additionally galvanically connected to an electric charging unit 16 of the onboard electrical system 3. Thus, the hybrid switching device 13 fulfils multiple functionalities in this case. The electric charging unit 16 is in particular formed as an onboard charger. With the aid of the electric charging unit 16, the onboard electrical system 3 can be connected to an AC power source 17 such that the AC voltage can be converted into a DC voltage for supplying the onboard electrical system 3 with the aid of the electric charging unit 16.

Figure 5:
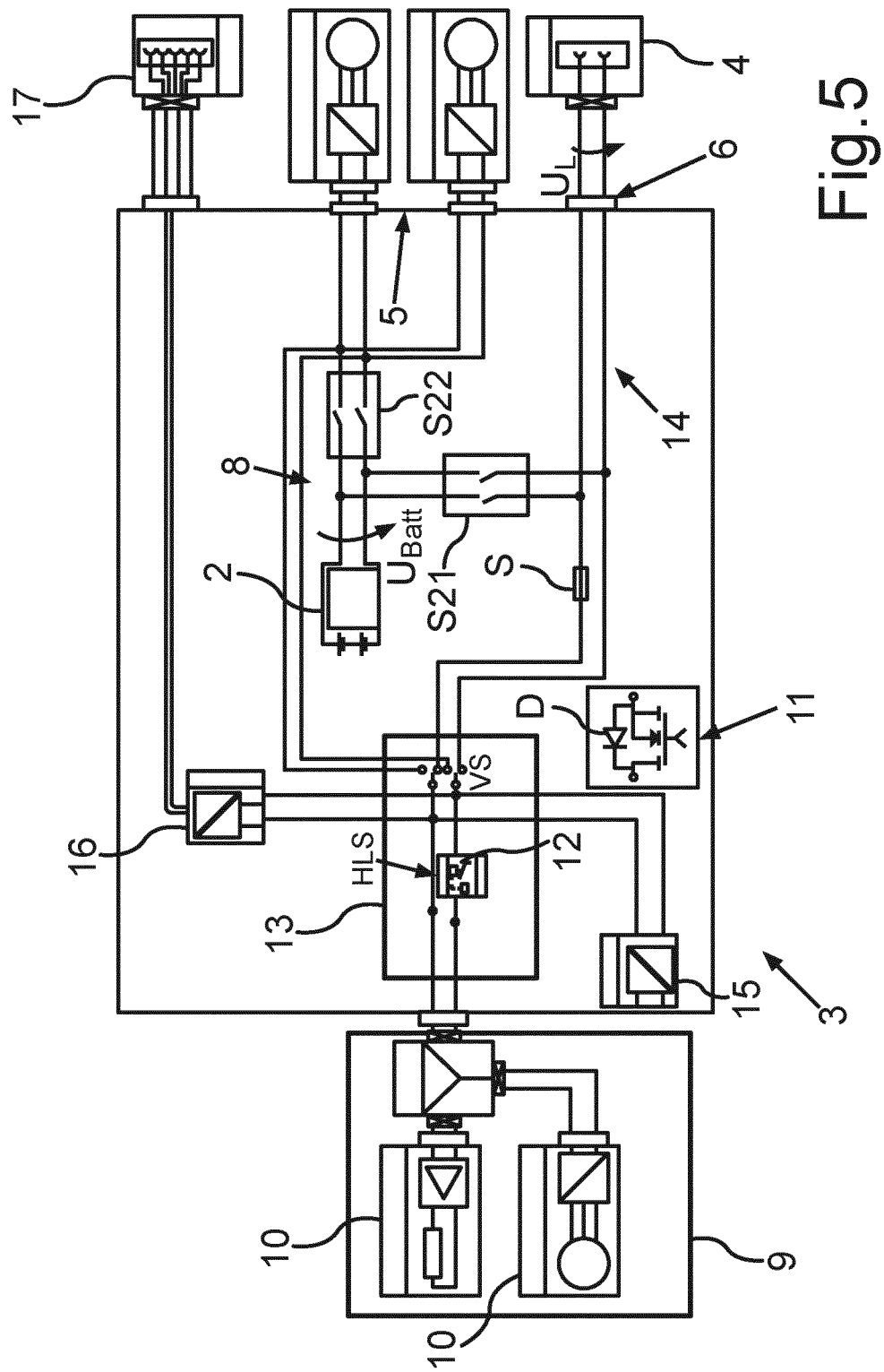
FIG. 5 is a further schematic embodiment of the onboard electrical system from FIG. 2.

A further variant is shown in FIG. 5. Therein, in addition to the electric charging unit 16, the DC voltage converter 15 can be galvanically connected to the hybrid switching device 13. Thus, the converted AC voltage of the AC power source 17 and the converted voltage of the DC voltage converter can be performed before the semiconductor fuse HLS on the one hand such that after the respective conversions of the voltages, they are already covered by the semiconductor fuse HLS. Thus, the electric components 10 of the second onboard electrical sub-system 9 can in particular be better protected.

LIST OF REFERENCE CHARACTERS

1 Vehicle
2 vehicle battery
3 onboard electrical system
4 power source external to vehicle
5 electric drive unit
6 charging terminal
7 first onboard electrical sub-system
8 third onboard electrical sub-system
9 second onboard electrical sub-system
10 electric components
11 semiconductor switch
12 switch element
13 hybrid switching device
14 charging path
15 DC voltage converter
16 charging unit
17 AC power source
C1 line capacitance
C2 capacitors
D diode
HLS semiconductor fuse
HV+, HV− potential lines
$U_{Batt}$ battery voltage
$U_L$ charging voltage
S fuse
S21, S22 first and second switch element
WS changeover switch
S1 to S7 first to seventh step

What is claimed is:

1. An onboard electrical system for a vehicle, comprising:
a first onboard electrical sub-system for an electric drive unit of the vehicle;
a second onboard electrical sub-system for electric components of the vehicle different from the electric drive unit;
a third onboard electrical sub-system for a vehicle battery of the vehicle; and
a charging terminal for providing a charging voltage of a power source,
wherein a changeover switch, a first switch element and a second switch element of the onboard electrical system are physically separated from each other,
wherein the second onboard electrical sub-system is galvanically connected either to the first onboard electrical sub-system or to the charging terminal by the changeover switch,
wherein during an electric charging mode of the vehicle battery, the charging terminal is galvanically connected to the third onboard electrical sub-system by the first switch element and to the second onboard electrical sub-system by the changeover switch, and the first onboard electrical sub-system is galvanically separated from the third onboard electrical sub-system by the second switch element and from the second onboard electrical sub-system by the changeover switch,
wherein during a driving mode of the vehicle, the charging terminal is galvanically separated from the third onboard electrical sub-system by the first switch element and from the second onboard electrical sub-system by the changeover switch, and the first onboard electrical sub-system is galvanically connected to the third onboard electrical sub-system by the second switch element and to the second onboard electrical sub-system by the changeover switch,
wherein the second onboard electrical sub-system is connected to the changeover switch by two potential lines and at least one of the two potential lines comprises a semiconductor fuse,
wherein the semiconductor fuse and the changeover switch together form a hybrid switching device, whereby the changeover switch is switchable load-free and the second onboard electrical sub-system is protected from a short circuit by the hybrid switching device,
wherein a battery voltage is provided by the vehicle battery, and the charging voltage is provided by the charging terminal,
wherein during the electric charging mode of the vehicle battery, the vehicle battery and the second onboard electrical sub-system are supplied with the charging voltage of the charging terminal, and
wherein during the driving mode of the vehicle, the first onboard electrical sub-system and the second onboard electrical sub-system are supplied with the battery voltage.

2. The onboard electrical system according to claim 1, wherein
the hybrid switching device is additionally galvanically connected to an electric charging unit of the onboard electrical system, or
the hybrid switching device is additionally galvanically connected to the electric charging unit and to a DC voltage converter of the second onboard electrical sub-system.

3. The onboard electrical system according to claim 1, wherein the semiconductor fuse comprises a switch element, wherein a current flow from the changeover switch towards the second onboard electrical sub-system can be inhibited by the switch element.

4. The onboard electrical system according to claim 1, wherein at least one of the two potential lines between the changeover switch and the charging terminal comprises an electrical fuse.

5. The onboard electrical system according to claim 1, the first switch element and the second switch element are each formed as a contactor or as a semiconductor switch.

6. A vehicle with an onboard electrical system according to claim 1.

7. The vehicle according to claim 6, wherein the second onboard electrical sub-system is connected to at least one of the electric components selected from a group consisting of an electric refrigerant compressor unit, an electric heating unit, a heat pump and a DC voltage converter.

* * * * *